US006182235B1

(12) United States Patent
Ma et al.

(10) Patent No.: US 6,182,235 B1
(45) Date of Patent: Jan. 30, 2001

(54) MICROCONTROLLER WITH A USER CONFIGURABLE PULSE WIDTH MODULATOR

(75) Inventors: Edward Tang Kwai Ma, Plano; Frank Victor Taylor, III, Highlandvillage; Sai Bun Samuel Wong, Dallas, all of TX (US)

(73) Assignee: Dallas Semiconductor Corporation, Dallas, TX (US)

( * ) Notice: Under 35 U.S.C. 154(b), the term of this patent shall be extended for 0 days.

(21) Appl. No.: 09/224,813

(22) Filed: Dec. 30, 1998

(51) Int. Cl.[7] ............................................. G06F 1/08
(52) U.S. Cl. ..................................................... 713/501
(58) Field of Search ................................. 713/500, 501, 713/600; 327/164, 172–176, 291; 331/46, 47, 50; 712/1, 32, 247

(56) References Cited

U.S. PATENT DOCUMENTS

| 4,908,790 | 3/1990 | Little et al. ........................ 364/900 |
| 5,237,699 | 8/1993 | Little et al. ........................ 395/750 |
| 5,303,390 | 4/1994 | Little ................................. 395/575 |
| 5,515,540 | 5/1996 | Grider et al. ..................... 395/750 |
| 5,577,235 | * 11/1996 | Mitra ................................. 713/600 |
| 5,615,228 | * 3/1997 | Soenen .............................. 375/238 |
| 5,754,462 | 5/1998 | Little ................................. 364/900 |
| 5,832,207 | 11/1998 | Little et al. ........................ 395/186 |
| 5,903,767 | 5/1999 | Little ............................. 395/750.05 |

* cited by examiner

*Primary Examiner*—Thomas M. Heckler
(74) *Attorney, Agent, or Firm*—Jenkens & Gilchrist

(57) ABSTRACT

A microcontroller integrated circuit incorporating a user configurable pulse width modulator. The pulse width modulator circuitry is configurable to be a single, for example 32-bit pulse width modulator, or a plurality of pulse width modulators each having a bit width that is divisible by the single 32-bit pulse width modulator (e.g., 2, 4, 8 or 16-bit pulse width modulators).

19 Claims, 6 Drawing Sheets

MICROCONTROLLER WITH A USER CONFIGURABLE PULSE WIDTH MODULATOR

BACKGROUND OF THE PRESENT INVENTION

1. Technical Field of the Invention

The present invention relates to integrated circuit devices and more particularly to microcontrollers that incorporate pulse width modulation circuitry.

2. Description of Related Art

The 8051 style microcontroller core is a microcontroller core that is commonly used in "embedded control" applications. The term "8051 microcontroller" hereinafter includes any microcontroller that executes, at least, a substantial portion of the well-known 8051 microcontroller instruction set. Embedded microcontrollers are frequently found in appliances (microwave ovens, toaster ovens, mixers, bread making machines), computers and computer related equipment (printers, modems, I/O cards, disk drives, scanners), automotive related devices (engine control, suspension control, diagnostics, traction control, anti-lock brakes), and manufacturing machinery (numeric control, stepper motor control, hydraulic presses, machine control, robotic control). Often more than one microcontroller can be found in a given machine, unit or device.

An 8-bit microcontroller is designed into many products and devices because of its small size, low power consumption and versatility. As the market for 8-bit microcontrollers continues to grow, manufacturers of microcontrollers scramble to make more efficient and useful microcontrollers which meet the needs of the industry.

Some microcontrollers include pulse width modulation circuitry in the integrated circuit. To date there have been drawbacks to the pulse width modulators incorporated into microcontroller circuitry. Such drawbacks include the inability of the user to change important aspects of the pulse width modulator such as the bit-width or resolution. Furthermore, prior pulse width modulators found in microcontrollers cannot be concatenated or divided to establish one large pulse width modulator or a plurality of smaller bit-width pulse width modulators.

SUMMARY OF THE INVENTION

It is an object of the present invention to provide a single integrated circuit which combines a microcontroller with a user configurable pulse width modular.

It is an object of the present invention to provide a microcontroller and a user configurable pulse width modulator on the same integrated circuit wherein the bit width of the pulse width modulator can be configured by a user.

It is also an object of the present invention to provide a user configurable pulse width modulator that can be divided into a plurality of pulse width modulators.

These and other objects are provided by the below described invention by providing a microcontroller that includes a user configurable pulse width modulator circuit that can be configured to provide, for example, one 16-bit, two 8-bit, or four 4-bit pulse width modulators.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by referring to the following Detailed Description of the Presently Preferred Exemplary Embodiments of the present invention in conjunction with the accompanying drawings wherein.

DETAILED DESCRIPTION OF THE PRESENTLY PREFERRED EXEMPLARY EMBODIMENTS

Figure 1:
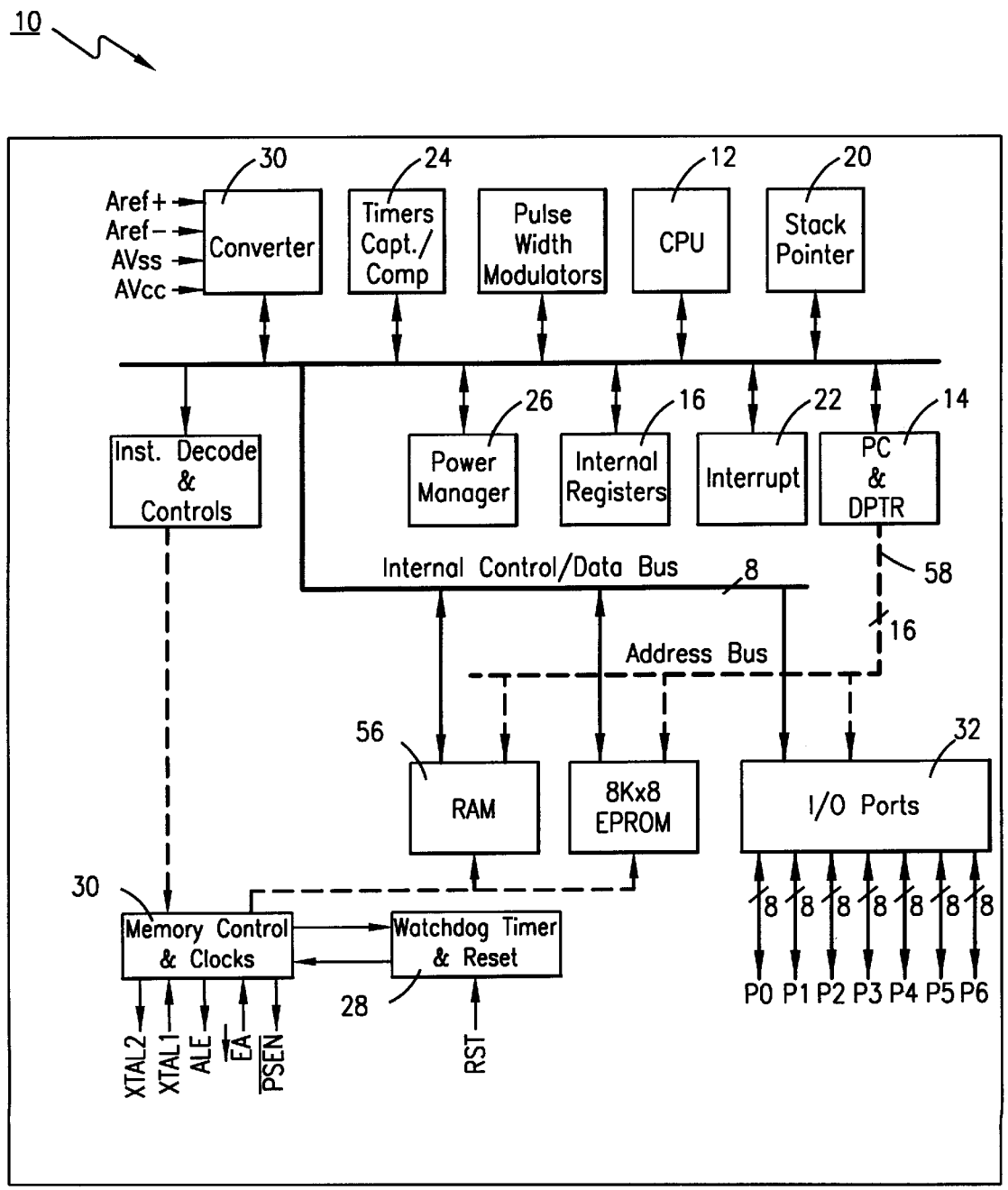
FIG. 1 depicts a block diagram of an exemplary microcontroller incorporating an exemplary user configurable pulse width modulator.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

An exemplary microcontroller is preferably a "high speed" 8-bit microcontroller operating at a crystal oscillator speed of up to about 33 MHZ. It is compatible with the 8051 microcontroller instruction set and offers additional hardware and firmware capabilities beyond the standard 8051 instruction set. Furthermore, the exemplary microcontroller may include an 8051-compatible high-speed microcontroller core which may have been redesigned to reduce the original 8051's 12 clocks per instruction cycle to four clocks per instruction cycle, while using less power.

In addition to providing standard 8051 functions with higher throughput, the exemplary microcontroller may include four 8-bit pulse width modulated output channels that generate programmable lengths and intervals. Each pulse width modulator has a dedicated clock generator that accepts one of four internal clock sources or external clocks as its clock reference. The exemplary four 8-bit pulse width modulators can be configured into two 16-bit pulse width modulators to provide longer repetition intervals and increased pulse width resolutions.

A preferred exemplary microcontroller may include a variety of features. Such features may include, but are not limited to, being 8051 instruction set compatible; having bi-directional I/O ports; having three 16-bit timers/counters with selectable up/down count as well as capture and compare features; having a scratchpad RAM; having a power on reset flag; having a stop mode which exits on a reset pulse; and utilizing low power CMOS logic.

The preferred microcontroller has a four cycle 8051 microcontroller style core which operates at a clock rate of about 0 to 33 MHZ. Higher clock rates are potentially achievable. It may contain bandgap circuitry to prevent low or high input power crashes. The bandgap circuitry may comprise a bandgap reference reset and/or a power-up reset time-out circuit.

The exemplary microcontroller further contains useful circuitry and functionalities. The exemplary microcontroller provides six external and ten internal interrupt sources. It has 1K bytes of on-chip data SRAM, 8K bytes of EPROM. The microcontroller may include timed access protection circuitry for control of "sensitive" secure or anti-pirating functions such as preventing accidental writes to critical functions. A programmable watchdog timer and a selectable internal ring oscillator for lower power operation may also be provided. There may also be two full-duplex hardware serial ports and four pulse width modulated output channels. The preferred exemplary microcontroller may further include an 8-channel 10-bit analog to digital ("A/D") converter as well as an oscillator failure detection circuit.

The exemplary embodiment provides four, or potentially more, pulse width modulated output channels. There may also be four capture and three compare logic modules. The preferred 8051 style 8-bit microcontroller core can also have a programmable data pointer decrement function with a toggle between two or more data pointers.

FIG. 1 depicts the main functional blocks of a preferred exemplary 8051 style microcontroller 10. It is understood that various aspects of the present invention are not limited to incorporation into an 8051 style microcontroller, but could also be incorporated into virtually any 8-bit, 16-bit, 32-bit, etc. microcontroller. A central processing unit, CPU, 12 contains an arithmetic logic unit, ALU, for calculations and logic functions, as well as the accumulator, program status words and the B-register (see FIG. 2).

A program counter and data pointer block, PC and DPTR, 14 block contains the program counter and two data pointers (DPTR and DPTR 1), which support fast data movement in data memory. The PC and DPTR 14 block also contains a data pointer select, DPS, register to support user selected data pointer options.

An internal registers block 16 is preferably an on-chip RAM that is divided into a scratchpad register area and a special function register (SFR) area.

An instruction decode and control block 18 contain the instruction register, the NOR-plane and the timing plane of a programmable logic array ("PLA") which generates the majority of the control signals for each instruction.

A stack pointer 20 contains a stack pointer register that is accessed during interrupts, LCALL, PUSH, and POP instructions. The stack pointer block 20 can be used to address memory locations in the scratchpad RAM.

An interrupt block 22 contains the control logic that detects and services all incoming interrupts from the micro. This interrupt block 22 can detect an interrupt and force an "LJMP" instruction into the instruction register. The "special function registers" which directly support the interrupts are contained in this interrupt block 22.

A timers block 24 includes three timers (timer 0, timer 1, and timer 2) as well as the necessary control logic for the timers. The special function registers that directly support a timer function and a capture/compare logic modules are also located in this block 24.

A power management block 26 includes a band-gap reference and analog circuitry to monitor power supply conditions to the integrated circuit. A watchdog timer and reset block 28 contains reset control logic, a watchdog timer register and a power control register which operates in communication with the power management block 26.

A memory control and clocks block 30 generates four phases of clocks C1–C4, machine cycle clocks B1–B5, and the peripheral clocks P1–P4. The clock block 30 also includes a clock control register.

A self-contained 8-channel 10-bit A/D converter 30 and four pulse width modulators are incorporated to support real-time applications. The A/D converter contains a 10-bit successive approximation analog to digital converter, an eight input analog multiplexer, an analog (digital) comparator, control SFRs and a result register. The pulse width modulators contain an independent selectable prescaled clock reference and external connections for clock references for their clock generators. The output of the clock generator is used for clocking the 8-bit free running timer in the pulse generator. SFRs provide programmable clock selection and controls. Each pulse width (PWM) modulator has its own frequency generator register and pulse width value register. The four 8-bit PWM channels can be used as two independent 16-bit PWM channels or be configured to be a plurality of variable length pulse width modulators (PWMs).

Seven I/O ports 32 are composed of parallel bi-directional pins, with each pin having an associated latch accessed via a SFR. Ports 0 to 5 are 8-bit ports. Port 0 and Port 2 can be used as a memory bus for off-chip memory access. Ports 1 and 3 have alternate functions that can be used in place of general I/O. Port 1 supports timer 2, serial Port 1 and four external capture trigger inputs. Port 3 supports serial port 0, two external interrupts, external inputs for Timers 0 and 1, and control strobes for external memory access. Port 4 can be used as Timer 2 compare match outputs. Port 5 provides analog inputs to the A/D converter. Port 6 is a 7-bit port, supporting the pulse width modulators' I/O and the A/D converter external trigger.

Figure 2:
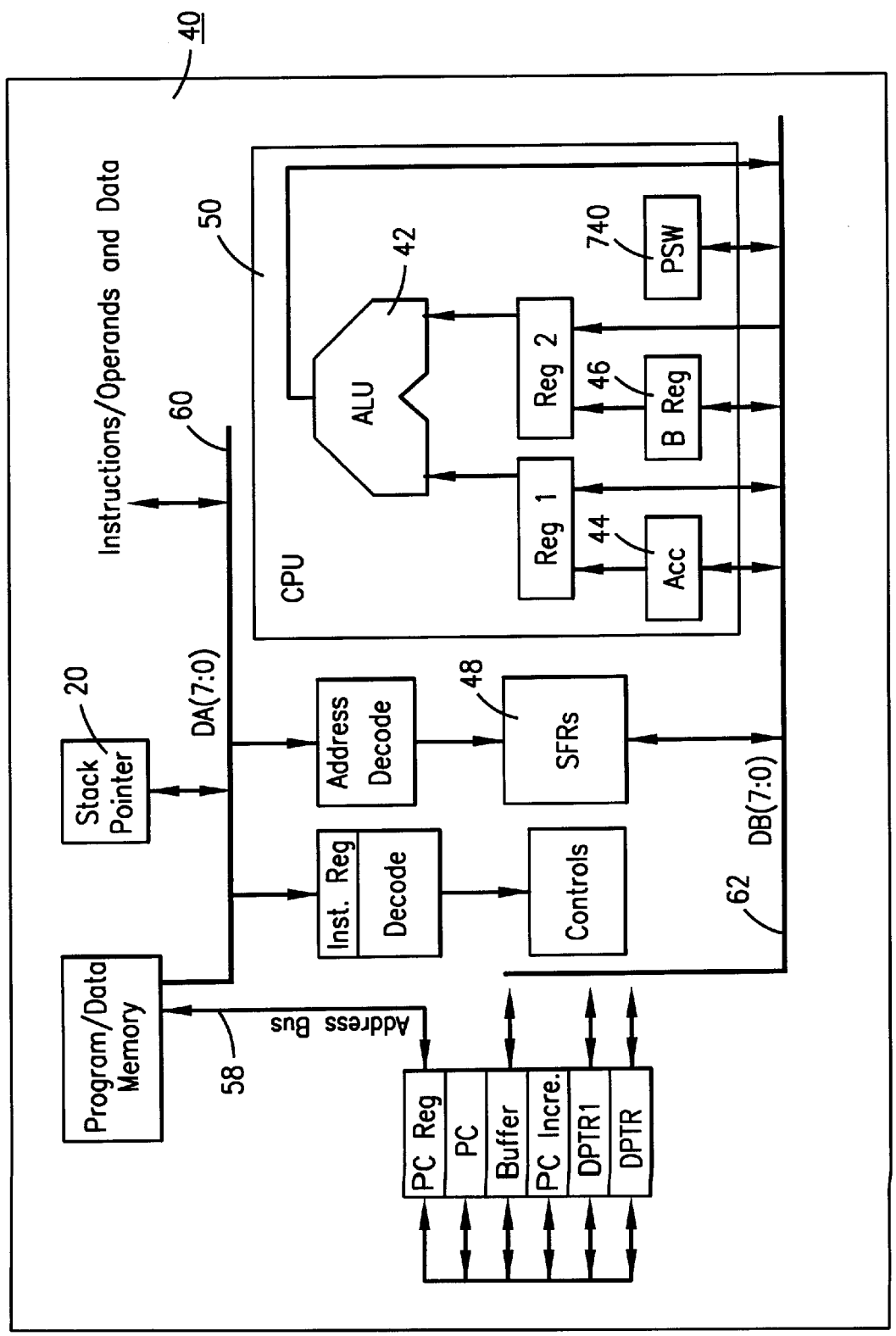
FIG. 2 depicts an exemplary microcontroller core of the exemplary micrcontroller of FIG. 1.

The exemplary microcontroller 10 is a high speed 8-bit microcontroller designed with an 8-channel 10-bit A/D converter and four pulse width modulators that are user configurable. Referring to FIG. 2, the exemplary high speed core 40 is an accumulator based architecture using internal registers for data storage and peripheral control. It executes the industry standard 8051 instruction set with a machine cycle that consists of four periods of the base oscillator, as compared to a machine cycle in the original 8051 microcontroller which consists of twelve cycles of the base oscillator.

The exemplary CPU 50 operates at four clocks per machine cycle. The main functional blocks of the exemplary microcontroller core is illustrated in FIG. 2. In general, an instruction is fetched and sent over the 8-bit internal data bus to a register of the execution unit ALU. The arithmetic logic unit, ALU 42, performs math functions, logical operations and makes comparisons and general decisions. The ALU 42 primarily uses the Accumulator 44 and a B register 46 as the source or destination for operations. It is understood that the CPU may operate at 1, 2, 4, 8, 12 or other numbers of clock cycles per machine cycles without leaving the spirit of the present invention.

All peripherals and operations that are not explicit instructions in the exemplary microcontroller are controlled via Special Function Registers (SFRs) 48. The Accumulator 44 is the primary register used in the CPU 50. It is the source or destination of most operations. The B register 46 is used as the second 8-bit argument in multiply and divide operations. When not used for these purposes, the B register 46 can be used as a general purpose register.

A Program Status Word (PSW) 52 contains several flags, including the Carry Flag, Auxiliary Carry Flag, General purpose Flag, Register Bank Select bits, Overflow Flag, and Parity Flag.

The Data Pointers (DPTR, DPTR1) 54, 55 are used to assign a memory address for a MOVX instruction. Two pointers are useful when moving data from one memory area to another memory area, or when using a memory mapped peripheral for both source and destination addresses.

The exemplary microcontroller 10 provides a stack in the on-chip RAM area 56 (FIG. 1). The Stack Pointer 20 denotes the register location at the top of the stack, which is the last used value.

Referring to both FIGS. 1 and 2, there are three main internal buses: one 16-bit address bus 58 and two 8-bit data buses (DA 60 and DB 62). The address bus provides address for opcode/operand fetching and all external instructions. The DA data bus 60 is used for addressing of SFRs 48 for fetched instructions and operands from external memory, and for providing addresses to the internal stack. The DB data bus 62 is used for data exchange between SFRs 48 and for output of all ALU 42 operations.

The Special Function Registers (SFRs) 48 provide the user selected functions that are not explicit instructions in the exemplary microcontroller 10, to control peripherals and programming modes. In many cases, an SFR controls an individual function or reports the function's status. The SFRs 48 preferably reside in register locations 80h-FFh and are only accessible by direct addressing. SFRs that end in 0h or 8h are preferably bit addressable.

All standard SFR locations from the 8051 style microcontroller are duplicated in the exemplary microcontroller 10. Several SFRs have been added to aid the additional novel features of the exemplary microcontroller 10. Most of these additional features are controlled by bits in SFRs located in unused SFR locations in the standard 8051 SFR map. This allows for increased functionality while maintaining complete instruction set compatibility.

Figure 3:
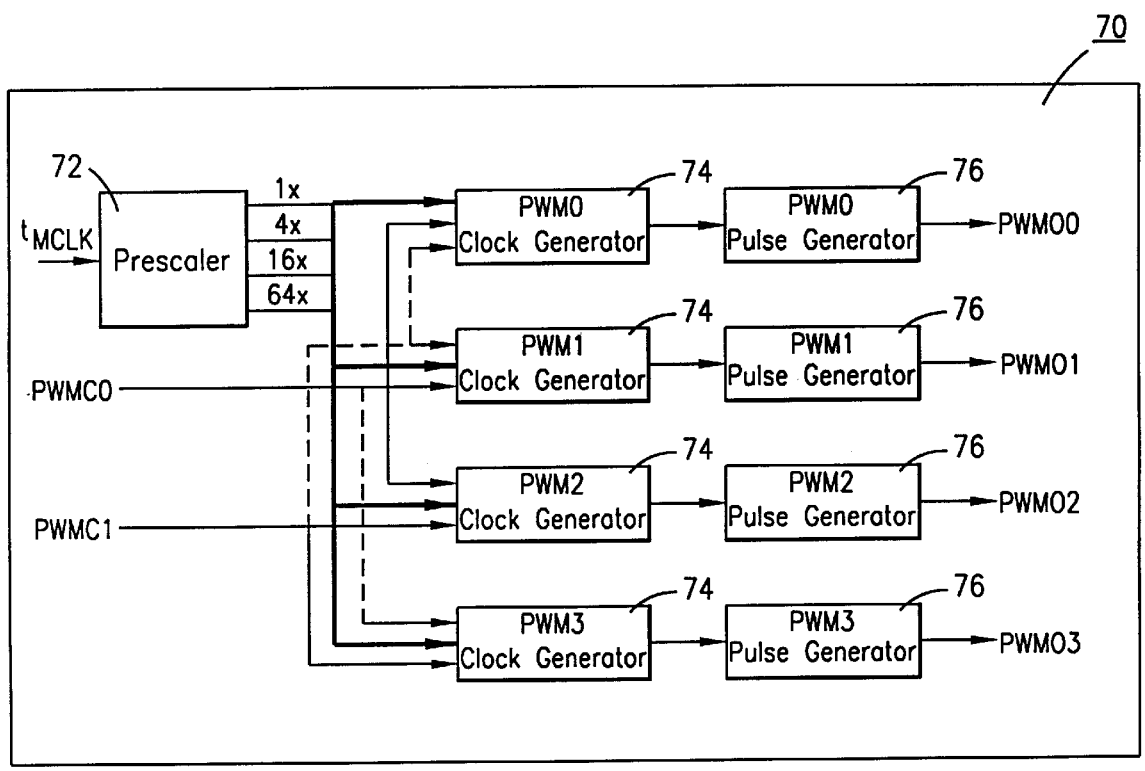
FIG. 3 depicts a block diagram of exemplary pulse width modulator circuitry in accordance with the present invention.

The exemplary microcontroller 10 incorporates four independent 8-bit pulse width modulators (PWMs) with independently selectable clock sources for their timer function. Each pulse width modulator is capable of generating an output waveform with a programmable duty cycle of n/256%, where n is between 0 and 255. The four 8-bit PWMs can be used as two 16-bit PWMs or two 8-bit PWMs and one 16-bit PWM by setting the corresponding 16-bit mode enable bits in the PWM Mode SFR. FIG. 3 illustrates the functional blocks for the pulse width modulators in the 8-bit mode. It is understood that the plurality of pulse width modulators do not each have to be the same bit-size. For example, each pulse width modulator circuit could be a different bit-size and still be concatentable.

Within the pulse width modulator circuitry 70, the prescaler 72 takes the CPU machine clock (MCLK) and divides it to produce four reduced clock outputs to the clock generators. The CPU machine clock period $t_{MCLK}$ is derived from the oscillator clock period multiplied by 1, 2, 4 or 1024 as determined by programming of the system clock divider bits. The prescaler 72 is capable of generating four clock speeds: $t_{MCLK} \times 1$, $T_{MCLK} \times 4$, $t_{MCLK} \times 16$, and $t_{MCLK} \times 64$. All clock speeds are available simultaneously if required. It is understood that other multipliers could also be used thereby producing a wider variety of clock speeds.

Four substantially identical clock generators 74, one for each of the four independent pulse width generators 76, each may contain an 8-bit auto-reloadable counter that provides a selectable clock frequency to an 8-bit free running timer contained therein. The timer value is compared to zero and to a user selectable value to set and reset a flip-flop, thereby determining and establishing the PWM duty cycle.

All four clock generators 74 are identical and operate substantially independent of each other. Each clock generator 74 accepts either the prescaled clock outputs or an external pin signal as inputs. PWMC0 may be selected as the external clock generator input for PWM0 and PWM1. PWMC1 may be selected as the external clock generator input for PWM2 and PWM3. If either of the external PWMC pins is to be used as the clock source, then the associated port bit latch must be programmed as an input by setting it to 1 to enable the alternate function of the pin. The external clock sources are sampled and synchronized to the internal CPU timing as with other 8051 compatible timer inputs. The dotted PWMC busses indicate that an external clock source potentially can clock any combination of the four clock generators.

Figure 4:
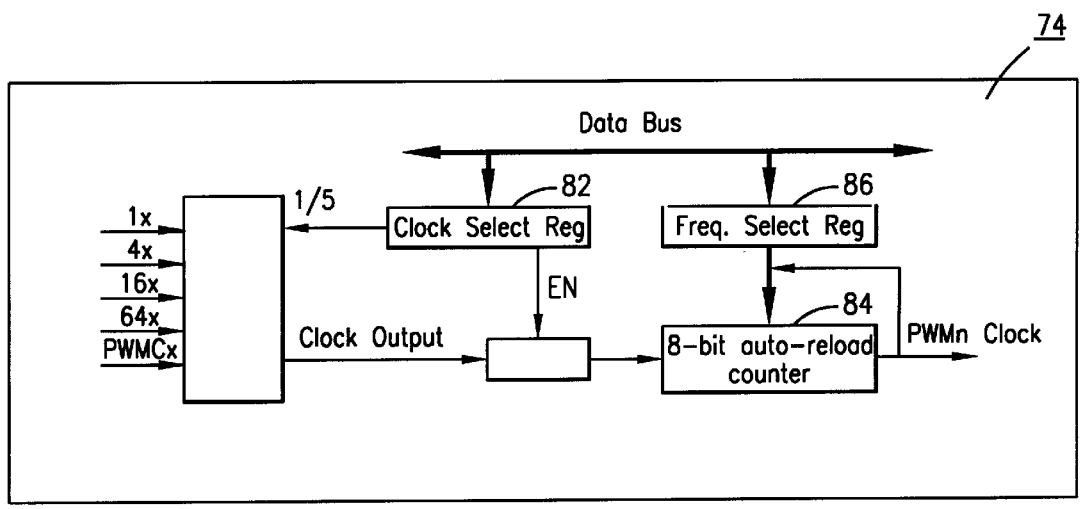
FIG. 4 depicts a block diagram of an exemplary clock generator in accordance with the present invention.

FIG. 4 shows the exemplary clock generator 80 functional blocks. There are five clock sources available to the clock generators, four of which are created and distributed by the prescaler 72.

Each clock generator, via the clock select Register 82, selects one of the five clock sources to drive an 8-bit auto-reloadable counter 84 by programming its associated clock select bits in the clock select registers 82.

The counter 84 output provides a divide by N+1 selectable frequency for its PWM channel. N is the value programmed into the frequency select register 86 of the PWM channel. When a value of 00h is programmed into the counter the input clock frequency is passed through as the clock output to the channel's pulse width generator 76. A value of FFh results in the clock input frequency being divided by 256 and output to the associated pulse width generator 76.

A frequency generator enable bit PWnEN in the clock select register 82 has to be set to enable the clock generator 80. The clock generator 80 is disabled after all forms of a reset signal and/or no clock is generated.

Figure 5:
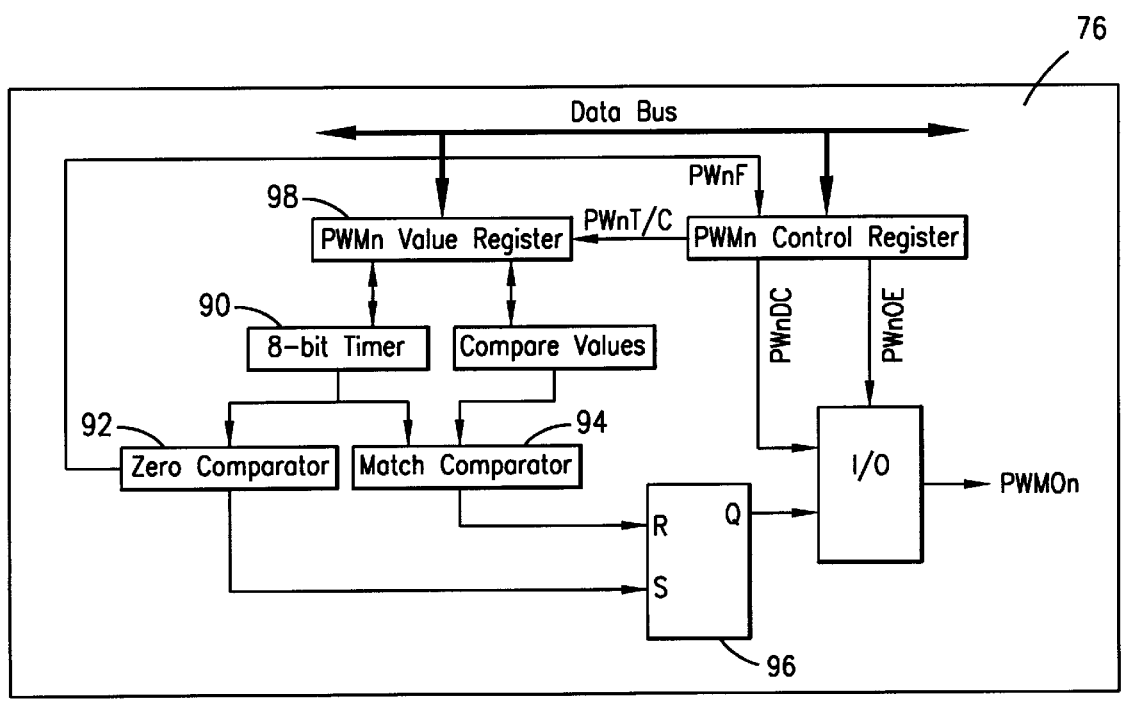
FIG. 5 depicts a block diagram of an exemplary pulse width modulator generator in accordance with the present invention.

The four 8-bit PWM channels are substantially identical and independent of each other. The pulse width generator 76 for each of the PWM channels is illustrated in FIG. 5.

Each pulse width generator 76 contains an 8-bit free running timer 90 which is clocked by its associated PWM clock generator. The timer value is compared to zero in the zero comparator 92 and to a user selectable value in the match comparator 94. Each time the timer value reaches zero, the zero comparator 92 sets a flip-flop 96.

When the timer 90 reaches the user selected PWM match value, the match comparator 94 resets the flip-flop 96. The user selected PWM match value thereby determines the PWM duty cycle.

If the channel's associated output enable bit PWnOE is set, the output of this flip-flop 96 is driven onto the associated port pin. The port pin's full complementary push-pull driver is enabled on the corresponding pin when the output enable bit is set. A weak pull-up on the pin is deactivated, and the general purpose port bit function is logically disconnected from the pin.

The zero rollover condition sets the PWnF bit for the associated channel. Since there is no interrupt vector in the exemplary microcontroller 10 that is dedicated to any PWM channel flag, this flag is useful only for polling purposes. This bit (PWnF) must be cleared by software to remove the flagged condition.

The PWM channel timer 90 value can be accessed via the PWM value register 98 with its associated PWnT/C bit set to 1. The PWM compare value can be read or written to the PWM value register 98 with its associated PWnT/C bit cleared to 0. The PWM match value is transferred from the value register 98 to the match comparator 94 after the next match occurs. Thus, the match value can be changed once every 256 clock cycles. This prevents software from creating glitches on the PWM output.

A PWM value of 00h creates a PWM output that is always zero. This special condition is deglitched to prevent a simultaneous set and reset. A PWM value of FFh creates a waveform that is high for 255 of 256 clock cycles. A DC override bit PWnDC which forces a constant 1 on the PWM output, is provided for each channel.

The exemplary microcontroller 10 also supports 16-bit PWMs by setting the corresponding 16-bit mode enable bit to a logic 1 in the 16-Bit PWM Mode Enable SFR.

Enabling the 16-bit PWM mode of operation concatenates two of the 8-bit free-running timers 90 together to form a 16-bit timer. The corresponding Zero 92 and Match comparators 94 also concatenate.

Setting a PMEO SFR bit to logic 1 enables 16-bit PWM0, formed by combining the 8-bit PMW0 (least significant byte) and PWM1 (most significant byte). Setting PME1 to logic 1 enables 16-bit PWM1, formed by combining 8-bit PWM2 (least significant byte) and PWM3 (most significant byte). Clearing the enable bit to 0 automatically enables the 8-bit PWM mode for the corresponding PWM channels. The 16-bit PWM mode enable bits default to 0 on all forms of reset. The feature allows the user the selection of four 8-bit PWMs, two 16-bit PWMs, or two 8-bit PWMs and one 16-bit PWM for various applications. It is understood, that the PWM could also be set for one 32-bit PWM if needed. More PWM channels could be added to provide more PWM resolution/bit-width combinations.

The PW0EN and PW0S bits provide the programmable clock controls to the 16-bit PWM channel 0, while the PW2EN and PW2S bits provide the programmable clock controls to the 16-bit PWM channel 1. The divisor values for the 16-bit PWM operating frequency are contained in the PW0FG and PW2FG registers. The four least significant bits in the PW01CS and PW23CS registers have no effect on PWM clock generation in 16-bit mode.

The 16-bit pulse generators function just like the 8-bit PWMs except the pulse generators act on a 16-bit boundary instead of 8-bit. If the channel's associated output enable bit PW0OE or PW2OE is set, the modulator pulses are driven out on the associated port pin P6.0 or P6.2, respectively. Port pins P6.1 and P6.3 can be used as general purpose I/Os. The 16-bit PWM match values are transferred from the value register to the match comparator after the next match occurs. Thus, the match value can be changed once every 65,536 cycles.

The SFR registers most relevant to the pulse width modulator functionality are described in the chart below:

| REGISTER | DESCRIPTION |
| --- | --- |
| PW0FG (D2h) Initialization: | PWM0 Frequency Generator Register This register is cleared to 00h on all forms of reset. |
| Read/Write Access: PW0FG.7-PW0FG.0 | Unrestricted read/write. This register contains the divisor value for the 8-bit PWM0 (also for the 16-bit PWM0 if PWE0 = 1) operating frequency, which is derived from the clock source selected by PW0S2-PW0S0 divided by the value of PW0FG + 1. This value is the reload value for the clock generator's 8-bit auto-reload timer. the PWM0 frequency is correct after one reload. |
| PW1FG (D3h) Initialization: | PWM1 Frequency Generator Register This register is cleared to 00h on all forms of reset. |
| Read/Write Access: PW1FG.7-PW1FG.0 | Unrestricted read/write. This register contains the divisor value for the 8-bit PWM1 operating frequency, which is derived from the clock source selected by PW1S2-PW1S0 divided by the value of PW1FG + 1. This value for the clock generator's 8-bit auto-reload timer. The PWM1 frequency is correct after one reload. This register has no effect on 16-bit PWM operation. |
| PW2FG (D4h) Initialization: | PWM2 Frequency Generator Register This register is cleared to 00h on all forms of reset. |
| Read/Write Access: PW2FG.7-PW2FG.0 | Unrestricted read/write. This register contains the divisor value for the 8-bit PWM2 (also for the 16-bit PWM1 when PWE1 = 1) operating frequency, which is derived from the clock source selected by PW2S2-PW2S0 divided by the value of PW2FG + 1. This value is the reload value for the clock generator's 8-bit auto-reload timer. The PWM2 frequency is correct after one reload. |
| PW3FG (D5h) Initialization: | PWM3 Frequency Generator Register This register is cleared to 00h on all forms of reset. |
| Read/Write Access: PW3FG.7-PW3FG.0 | Unrestricted read/write. This register contains the divisor value for the 8-bit PWM3 operating frequency, which is derived from the clock source selected by PW3S2-PW3S0 divided by the value of PW3FG + 1. This value is the reload value for the clock generator's 8-bit auto-reload timer. The PWM3 frequency is correct after one reload. This bit has no effect on 16-bit PWM operation. |
| PWMADR (D6h) | 16-Bit PWM Mode Enable and A/D Reference Select |
| Initialization: | This register is initialized to 0xxxx00b on all forms of reset. |
| Read/Write Access: | Unrestricted read/write. |
| PWMADR.0: PWE0 | 16-bit PWM Enable 0. Setting this bit to 1 enables the 16-bit PWM channel 0. The 16-bit PWM0 is formed by combining the 8-bit PWM0 and PWM1 channels. The corresponding free-running Timers, the Zero and Match Comparators, and the value registers are concatenated to form the 16-bit PWM0 channel. Clearing this bit to 0 disables the 16-bit PWM0 and automatically enables the 8-bit PWM0 and PWM1. |
| PWMADR.1: PWE1 | 16-bit PWM Enable 1. Setting this bit to 1 enables the 16-bit PWM channel 1. The 16-bit PWM1 is formed by combining the 8-bit PWM2 and PWM3 channels. The corresponding free-running Timers, the Zero and Match Comparators, and the value registers are concatenated to form the 16-bit PWM1 channel. Clearing this bit to 0 disables the 16-bit PWM1 and automatically enables the 8-bit PWM2 and PWM3. |
| PWMADR.2-PWMADR.6 | Reserved. |
| PWMADR.7:ADRS | A/D Reference Select. Setting this bit to 1 selects an external source as the |

| REGISTER | DESCRIPTION |
|---|---|
| | reference voltage for A/D conversions. Clearing this bit to 0 selects the internal bandgap as the reference voltage. |

The pulse width modulator circuitry of the present exemplary embodiments is not limited to incorporation with only an 8051 style microcontroller core. It could also be slightly modified, without leaving the spirit of the invention, to be a 32-bit or 64-bit pulse width modulator. Furthermore, the channels could be designed to be less than an 8-bit PWM channel.

The present exemplary embodiment provides a microcontroller combined with a plurality of pulse width modulators. The plurality of pulse width modulators can be configured by a user to be combined to provide different bit-size pulse width modulators depending on the needs of the user. Thus, a single microcontroller de vice can be configured to operate in various systems requiring varying ranges of pulse width modulation resolution. Potentially 4, 8, 16, 32, 64, and other pulse width modulation resolutions can be made available by a single device. An innovation of the exemplary microcontroller is the two separate 8-bit pulse width modulation channels can be linked together to operate as a single 16-bit pulse width modulator via a user programmable configuration.

The exemplary microcontroller c an provide four 8-bit modulators, two 16-bit modulators or two 8-bit and one 16-bit modulators. Simple modifications would allow one 8-bit and one 24-bit modulator or one 32-bit.

Figure 6:
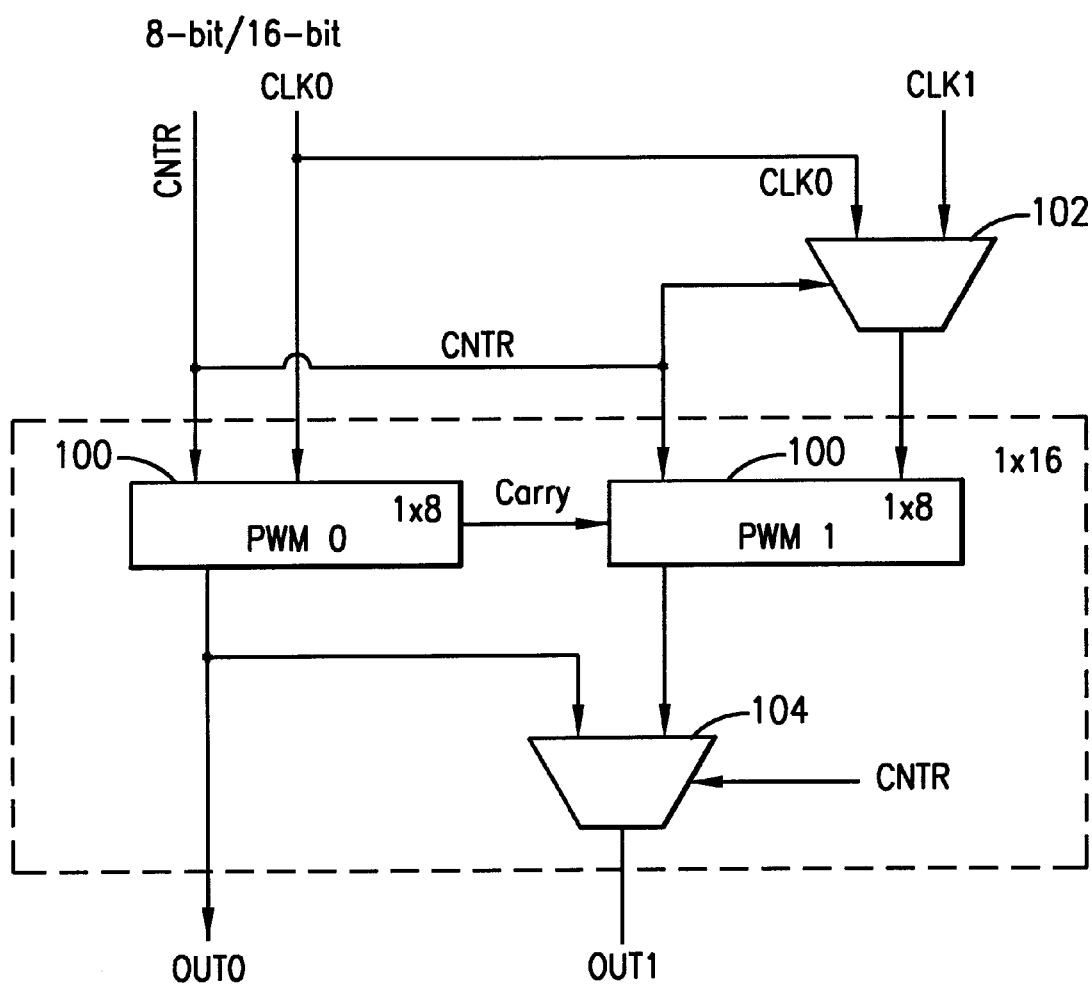
FIG. 6 depicts a high level schematic/block diagram of an exemplary pulse width modulator configuration.

Referring now to FIG. 6, there is depicted how two pulse width modulators can be used separately or be concatenated to provide one larger pulse width modulator. Two 8-bit PWM modules 100, which are independent, are labeled PMW0 and PWM1. Each of the 8-bit PWM modules may have a different clock source. The different clock sources could be ClK0 and ClK1 as shown. In the dual 8-bit PWM configuration, each PWM (PMW0 and PwM1) have separate outputs labeled out0 and out1, respectively.

If a user wants to switch from the dual 8-bit mode to a 16-bit PWM mode, the control line, CNTR, can be used. The CNTR line will switch the MUX circuit 102 to allow CLK0 to be used by both PMW0 and PWM1. The CNTR line will also switch MUX 104 to provide a single 16-bit PWM output. Furthermore, the CNTR line will require PMW0 to provide a carry bit to PWM1. Such that the two PWM modules are concatenated. Thus, a user can configure the size of the PWM required for a particular need or design.

As is clearly seen, the present invention is a significant improvement in the art by providing, at least, a microcontroller with a user configurable pulse width modulator(s). Such a device can be used in a variety pulse width modulation activities and allow an electronic designer to become familiar with a single microcontroller device rather than a plurality of different microcontroller devices. The present invention is believed to be specifically effective when configured and employed as described herein, however, those skilled in the art will readily recognize that numerous variations and substitutions may be made in the invention and its use and configuration to achieve substantially the same results as achieved by the embodiments and, in particular, the preferred embodiments described herein. Each of the variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A microcontroller integrated circuit comprising:
   a microcontroller core;
   a first data bus connected to said microcontroller core;
   a first user configurable pulse width modulation circuit connected to said first data bus; and
   a second user configurable pulse width modulation circuit connected to said first data bus, said first user configurable pulse width modulation circuit and said second user configurable pulse width modulation circuit being concatenatable to thereby create a third user configurable pulse width modulator circuit.

2. The microcontroller integrated circuit of claim 1, further comprising special function registers mapped substantially in accordance with an 8051 style microcontroller requirement.

3. The microcontroller integrated circuit of claim 1, wherein said first user configurable pulse width modulation circuit comprises:
   a clock generator circuit for configuring a pulse width modulation clock signal, and
   a pulse generator circuit for generating a pulse width modulation output.

4. The microcontroller integrated circuit of claim 3, wherein said second user configurable pulse width modulation circuit comprises:
   a clock generator circuit for configuring a pulse width modulation clock signal, and
   a pulse generator circuit for generating a pulse width modulation output.

5. The microcontroller integrated circuit of claim 1, wherein said first user configurable pulse width modulation circuit and said second user configurable pulse width modulation circuit are each 8-bit pulse modulation circuits.

6. The microcontroller integrated circuit of claim 1, wherein said third user configurable pulse width modulator circuit is a 16-bit pulse width modulation circuit.

7. The microcontroller integrated circuit of claim 1, wherein said first user configurable pulse width modulator is an X-bit pulse width modulation circuit, said second user configurable pulse width modulator is a Y-bit pulse width modulation circuit, and said third user configurable pulse width modulator circuit is an X+Y bit pulse width modulation circuit.

8. The microcontroller integrated circuit of claim 1, wherein said microcontroller core is substantially an 8051 compatible microcontroller core.

9. The microcontroller integrated circuit of claim 1, wherein said microcontroller core is a four-cycle 8051 compatible microcontroller core.

10. A microcontroller comprising:
    a central processing circuit;
    a data bus connected to said central processing circuit; and
    at least two user-configurable pulse width modulation circuits that are user configurable said at least two pulse width modulation circuits being connected to said data bus.

11. The microcontroller of claim 10, further comprising dual data pointer circuitry connected to said data bus.

12. The microcontroller of claim 10, wherein said central processing circuit is at least one of a four-cycle central processing core and a one-cycle central processing core.

13. The microcontroller of claim 10, wherein said at least two pulse width modulation circuits are each 8-bit pulse width modulation circuits.

14. The microcontroller of claim 10, wherein said at least two pulse width modulation circuits are each different bit-length pulse width modulation circuits.

15. A microcontroller comprising:

a central processing core;

a first pulse width modulation circuit;

a second pulse width modulation circuit;

at least one data bus connected to said central processing core, said first pulse width modulation circuit, and to said second pulse width modulation circuit, said first pulse width modulation circuit and said second pulse width modulation circuit each being user configurable so that said first pulse width modulation circuit can operate independently of said second pulse width modulation circuit and so that said first pulse width modulation circuit and said second pulse width modulation circuit can be combined to provide a third pulse width modulation circuit.

16. The microcontroller of claim 15, wherein said central processing core is an 8051 instruction set compatible microcontroller.

17. The microcontroller of claim 15, wherein said first pulse width modulation circuit is an 8-bit pulse width modulation circuit.

18. The microcontroller of claim 17, wherein said second pulse width modulation circuit is other than an 8-bit pulse width modulation circuit.

19. The microcontroller of claim 15, wherein said central processing core is a four-cycle microprocessing core.

* * * * *